United States Patent
Shimizu et al.

(10) Patent No.: US 7,174,057 B2
(45) Date of Patent: Feb. 6, 2007

(54) OPTICAL WAVEGUIDE MODULE, OPTICAL WAVEGUIDE FILM AND MANUFACTURING METHOD THEREOF

(75) Inventors: Keishi Shimizu, Nakai-machi (JP); Shigemi Ohtsu, Nakai-machi (JP); Kazutoshi Yatsuda, Nakai-machi (JP); Eiichi Akutsu, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/005,077

(22) Filed: Dec. 7, 2004

(65) Prior Publication Data

US 2006/0002651 A1 Jan. 5, 2006

(30) Foreign Application Priority Data

Jun. 30, 2004 (JP) .............................. 2004-193847

(51) Int. Cl.
*G02F 1/01* (2006.01)
(52) U.S. Cl. ........................................................ 385/1
(58) Field of Classification Search ................. 65/386, 65/404
See application file for complete search history.

(56) References Cited

U.S. PATENT DOCUMENTS 5,999,670 A * 12/1999 Yoshimura et al. ........... 385/31
6,968,109 B2 * 11/2005 Furuyama .................... 385/129
2005/0238278 A1 * 10/2005 Nakashiba et al. ........... 385/14

FOREIGN PATENT DOCUMENTS

| JP | A-10-300961 | 11/1998 |
| JP | A-2000-039530 | 2/2000 |
| JP | A-2000-039531 | 2/2000 |
| JP | A-2000-235127 | 8/2000 |
| JP | A-2002-333538 | 11/2002 |
| JP | A-2004-029507 | 1/2004 |
| JP | A-2004-086144 | 3/2004 |
| JP | A-2004-109927 | 4/2004 |

* cited by examiner

*Primary Examiner*—Michelle Connelly-Cushwa
*Assistant Examiner*—Chris Chu
(74) *Attorney, Agent, or Firm*—Oliff & Berridge, PLC (57) ABSTRACT

An optical waveguide module includes a light emitting element which outputs light, a light receiving element which monitors an output of the light emitting element, and an optical waveguide film having a waveguide core which has a notched portion having an optical path changing surface that changes an optical path of part of the light. The light emitting element is coupled to an end portion of the optical waveguide film, and the light receiving element is provided to face a position of the optical waveguide film from where the part of the light whose optical path has been changed by the optical path changing surface exits.

2 Claims, 4 Drawing Sheets

OPTICAL WAVEGUIDE MODULE, OPTICAL WAVEGUIDE FILM AND MANUFACTURING METHOD THEREOF

BACKGROUND OF THE INVENTION

1. Field of the Invention

The present invention relates to an inexpensive waveguide film type optical module which is formed by combining an optical waveguide film and a light emitting element such as a VCSEL, an optical waveguide film which is used in the waveguide film type optical module and a manufacturing method thereof.

2. Description Related Art

As a method for manufacturing a polymer optical waveguide, there have been proposed (1) a method in which monomer is impregnated into a film, a core portion is selectively exposed to change a refractive index and the film is laminated to the core portion (a selective polymerization method), (2) a method in which a core layer and a clad layer are coated with a material and a clad portion is formed using reactive ion etching (a RIE method), (3) a method which uses a photolithography method by performing exposure and developing using ultraviolet curable resin which is formed by adding a photosensitive material into the inside of a polymer material (a direct exposure method), (4) a method which utilizes injection molding, (5) a method in which a core layer and a clad layer are applied with a material and, thereafter, a core portion is exposed so as to change a refractive index of the core portion (photo bleaching method) and the like.

However, the selective polymerization method (1) has a drawback with respect to the lamination of the film, the methods (2), (3) become costly due to the use of the photolithography method, and the method (4) has a drawback with respect to the accuracy of an obtained core diameter. Further, the method (5) has a drawback that it is difficult to obtain the sufficient difference in refractive index between the core layer and the clad layer.

Currently, although the methods which exhibit the excellent performance in terms of practical use are the methods (2), (3), these methods have the above-mentioned drawbacks on cost. Further, any one of the methods (1) to (5) is not applicable to the formation of the polymer optical waveguide on a flexible plastic substrate having a large area.

In view of the above circumstances, inventors of the present invention have invented and have filed patent applications on a manufacturing method of a polymer optical waveguide which uses a mold as a method completely different from the above-mentioned conventional manufacturing methods of polymer optical waveguide (see, Japanese Patent Laid-Open Publication Nos. 2004-29507, 2004-86144, and 2004-109927). This method is extremely simple, can be performed at a low cost, and can manufacture the polymer optical waveguides on a mass production basis. Further, in spite of the easiness of manufacturing, the method can manufacture the polymer optical waveguides which exhibit a small waveguide loss and also can easily manufacture the polymer optical waveguides having any pattern shape provided that the mold can be formed. Still further, although it has been difficult to form the optical waveguide on the flexible substrate conventionally, this method has succeeded in the formation of the optical waveguide on the flexible substrate.

Here, recently, in the IC technique and the LSI technique, to enhance the operation speed and the integration density, the use of optical wiring between equipments, between boards in the inside of an equipment or in the inside of a chip in place of the electric wiring with high density has been attracting attentions.

As an element for optical wiring, for example, an optical element having the following constitution is described in Japanese Patent Laid-Open Publication No. 2000-39530. That is, in this patent document, a polymer optical waveguide having a core and a clad which wraps the core is provided with a light emitting element and a light receiving element in the core/clad stacking direction, and further, includes an incident-side mirror which allows light from the light emitting element to be incident on a core and an exit-side mirror which allows light exited from the core to enter into a light receiving element. In such an optical element, at portions corresponding to an optical path from the light emitting element to the incident-side mirror and an optical path from the exit-side mirror to the light receiving element, the clad layer is formed in a recessed shape so as to converge the light from the light emitting element and the light from the exit-side mirror. Further, an optical element having the following constitution is described in Japanese Patent Laid-Open Publication No. 2000-39531. That is, in this patent document, in the optical element which allows light from a light emitting element to be incident on a core end face of a polymer optical waveguide having a core and a clad which wraps the core, a light incident end face of the core is formed to have a convex shape which projects toward the light emitting element so as to converge the light from the light emitting element whereby the waveguide loss is suppressed.

Further, Japanese Patent Laid-Open Publication No. 2000-235127 describes an optoelectronic integrated circuit in which a polymer optical waveguide circuit is directly assembled to an optoelectronic fusion printed circuit board which integrates electronic elements and optical elements.

In the above-mentioned optical wiring, it is considered that if the above-mentioned elements could be mounted and could be incorporated into the inside of the apparatus, the degree of freedom in designing the assembling of the optical wiring could be increased and, as a result, compact and small light receiving and emitting elements could be provided.

However, the methods which have been proposed heretofore form a 90° folding mirror and hence, it is necessary to embed a mirror portion, and it is necessary to perform the highly accurate alignment at the time of laminating the optical waveguide and the light receiving and emitting elements thus giving rise to a serious drawback that the cost for mounting is pushed up.

On the other hand, in the optical module which is served for guiding the light of the light emitting element such as the VCSEL or the like to a connector to be connected with an optical fiber, an optical module of a type which couples the light through a micro lens and a 45 degree mirror is generally used. Such a constitution, however, requires one or two micro lenses on the light-emitting-element side and also at least one micro lens on the optical-fiber side whereby the cost necessary for forming the micro lenses and for aligning the optical axes of the micro lenses are pushed up. Further, in reflecting the light which propagates in space on a 45° mirror surface, to enhance the reflection efficiency, it is necessary to form an aluminum film by vapor deposition. This also pushes up the cost.

Accordingly, the optical module which uses an optical waveguide film has been attracting attentions in view of the lowering of the cost. This is because that when the end face of the optical waveguide film is formed into a 45° mirror surface and is directly adhered to the planar light emitting element such as the VCSEL or the like, the coupling which requires no micro lenses can be realized. Here, as a method for forming the optical waveguide film, the manufacturing method which is disclosed in the above-mentioned patent documents (Japanese Patent Laid-Open Publication Nos. 2004-29507, 2004-86144 and 2004-109927) is advantageous for lowering the cost.

However, the light output of the laser element such as the VCSEL or the like fluctuates due to an ambient temperature or the like, for example. To obtain the stable light output, it is necessary to monitor and feedback the light output per se. In this respect, in case of the optical waveguide module, efforts have been made including the provision of a branch waveguide for taking out and monitoring a portion of the light output. When the multiple light emitting points such as a 1×4 VCSEL array are used, it is difficult to ensure spaces for arranging photo detectors for monitoring (PD) and to connect waveguides branched to the spaces with the photo detectors for monitoring. When the photo detectors for monitoring are arranged on a side surface of the optical waveguide film, for example, by branching the branch waveguides from the waveguide which is coupled to two external light emitting points, it is possible to easily guide a portion of the output light to the photo detectors for monitoring. However, to branch the branch waveguides from the waveguide which is connected with two internal light emitting points to take out the light to the outside, it is necessary to make the branch waveguides intersect the external waveguide. Although a crosstalk is hardly generated when the waveguides orthogonally intersect each other at the intersecting portion, a slight waveguide loss is generated at the portion with respect to the external waveguide thus giving rise to a drawback that output characteristics differ between the inside and the outside. In this case, when the photo detectors for monitoring are collectively arranged outside in a 1×4 mode for lowering the cost, there arises a drawback that the number of intersections of the monitor waveguides is increased thus arising the possibility that the loss is increased and the output characteristics of the array waveguides differ.

SUMMARY OF THE INVENTION

The present invention has been made in view of the above circumstances and provides an optical waveguide module which can monitor an output from a light emitting point using the simple constitution. Particularly, an aspect of the present invention provides an optical waveguide module including a light emitting element which outputs light, a light receiving element which monitors an output of the light emitting element, and an optical waveguide film having a waveguide core which has a notched portion having an optical path changing surface that changes an optical path of part of the light. The light emitting element is coupled to an end portion of the optical waveguide film, and the light receiving element is provided to face a position of the optical waveguide film from where the part of the light whose optical path has been changed by the optical path changing surface exits.

BRIEF DESCRIPTION OF THE DRAWINGS

Embodiments of the present invention will be described in detail based on the following figures, wherein:

FIG. 1A to FIG. 1D are views showing examples of an optical waveguide module of the present invention, wherein FIG. 1A and FIG. 1B illustrate the mode in which a notched portion is exposed to air and FIG. 1C and FIG. 1D illustrate the example in which the notched portion is filled with a cured material of ultraviolet ray curable resin;

FIG. 2A to FIG. 2C are views showing another example of the optical waveguide module of the present invention, wherein

DETAILED DESCRIPTION OF THE INVENTION

An optical waveguide module according to an aspect of the present invention includes a light emitting element, a light receiving element for monitoring an output of the light emitting element (hereinafter, simply referred to as "light receiving element for monitoring" or "light receiving element"), and an optical waveguide film, and is characterized in that a waveguide core in the optical waveguide film has a notched portion having an optical path changing surface at a portion thereof which extends from an upper surface to a lower surface thereof, the light emitting element is coupled to an end portion of the optical waveguide film, and the light receiving element for monitoring is provided at a position which is below the optical waveguide film and from which a portion of the waveguided light which has an optical path thereof changed by the optical path changing surface exits.

With respect to the upper surface and the lower surface of the waveguide core, in the optical waveguide module which mounts the light emitting element, the light receiving element for monitoring and the optical waveguide film, a surface which is arranged close to the light receiving element for monitoring of the waveguide core forms the lower surface and a surface which is arranged remote from the light receiving element for monitoring of the waveguide core forms the upper surface (see FIG. 1).

The coupling of the end portion of the optical waveguide film and the light emitting element is suitably selected depending on a kind of the light emitting element. For example, when the light emitting element is a surface emitting type light emitting element, an optical path changing mirror surface (for example, a 45° mirror surface) is formed on one end portion of the optical waveguide film, and the end portion on which the mirror surface is formed and the light emitting element are coupled to each other. Further, when the light emitting element is a side emitting type light emitting element, to enable the direct bonding of an end face of the optical waveguide film and a side emitting element, for example, a vertical end face is formed and the end faces are coupled to each other.

Although the explanation is made with respect to the following optical waveguide film which is provided with the optical path changing mirror surface on one end portion in the optical waveguide film described hereinafter, the present invention is not limited to such an optical waveguide film.

The optical waveguide module of the present invention is explained in conjunction with FIG. 1A to FIG. 1D.

Figure 1A:
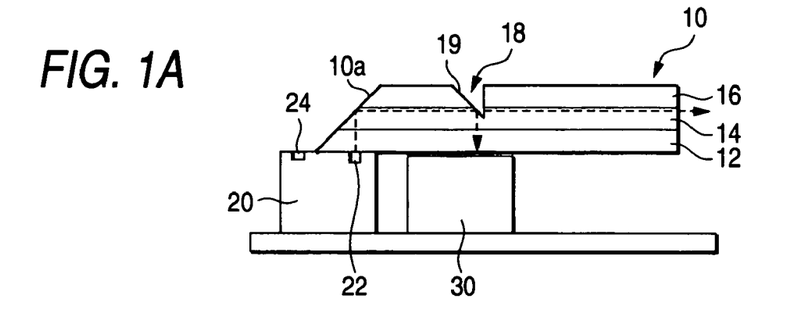
Figure 1B:
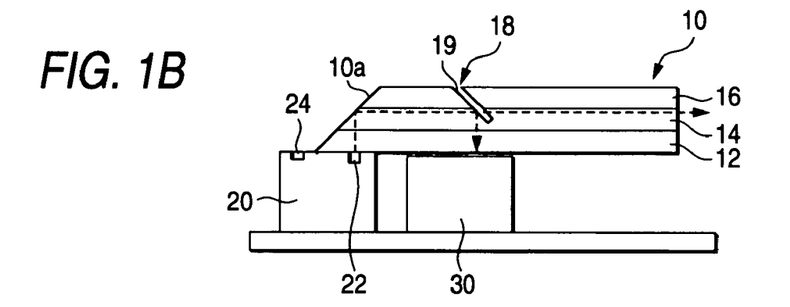

First of all, in FIG. 1A and FIG. 1B, a example in which the notched portion is exposed to or in contact with air is shown. In FIG. 1A, numeral 10 indicates the optical waveguide film, numeral 10a indicates the optical path changing mirror surface, numeral 12 indicates a lower clad film, numeral 14 indicates the waveguide core, numeral 16 indicates an upper clad film, numeral 18 indicates a notched portion having an optical path changing surface, and numeral 19 indicates an optical path changing surface. Further, numeral 20 indicates the light emitting element, numeral 22 indicates a light emitting point, and numeral 24 indicates an electrode. Numeral 30 indicates the light receiving element for monitoring. The end portion of the optical waveguide film on which the optical path changing mirror surface is formed is coupled to the light emitting element using an adhesive agent or the like not shown in the drawing. Further, the light receiving element for monitoring is coupled to the lower clad film in the same manner. Further, a dotted line indicates an optical path from the light emitting point.

In the above-mentioned optical path changing mirror surface 10a and optical path changing surface 19, to perform the 90° optical path changing, the optical path changing mirror surface 10a may be formed of a 45° mirror surface and the optical path changing surface 19 may be formed of a 45° inclined surface. Such a constitution is adopted in the above-mentioned example.

The light emitted from the light emitting point propagates in the inside of the core while being guided after an optical path thereof is changed by the 45° mirror surface and most of the light exits from another end portion of the core. However, a portion of the light has an optical path thereof changed by the optical path changing surface formed in the notched portion and is received by the light receiving element for monitoring. In such an optical waveguide module, the notched portion is formed toward the inside of the core from a surface of the upper clad film. Accordingly, the notched portion is exposed to or in contact with air and hence, the refractive index difference is large whereby the portion of the light is almost reflected and forms the monitoring light.

In the optical waveguide film, a loss is determined based on a rate of depth of a notched portion with respect to the core size. For example, when the notched portion cuts into the core having a diameter of 50 μm from a surface of the upper clad film and reaches a depth of 5 μm of the core upper portion, the loss attributed to the notch structure can be suppressed to approximately 10%.

Further, the notched portion may be formed using either a dicing saw having an extremely thin vertical cutting blade or laser beams, for example.

An example of the above-mentioned optical waveguide module which reduces the loss is shown in FIG. 1B. In FIG. 1B, parts indicated by the equal symbols in FIG. 1A indicate identical parts.

The notched portion formed in the optical waveguide module shown in FIG. 1B is formed from the surface of the upper clad film in the same manner as the optical waveguide module shown in FIG. 1A. However, compared to the optical waveguide module shown in FIG. 1A, an area of a notch opening portion generated by notching is small and hence, the optical waveguide module shown in FIG. 1B has the characteristics that the light which is not totally reflected as the monitor light and slightly leaks although the light reaches the notched portion can be easily taken into the waveguide again.

Figure 1C:
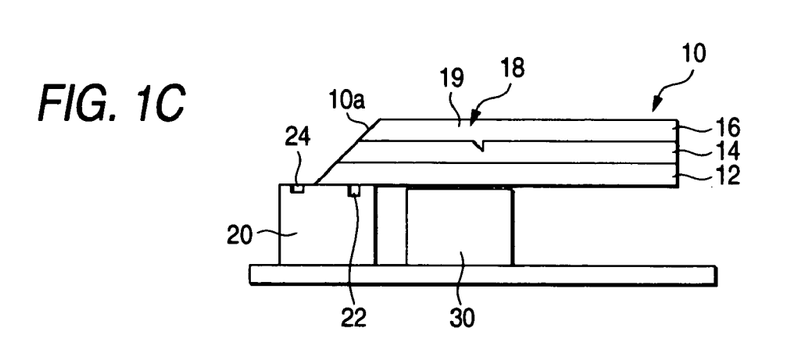
Figure 1D:
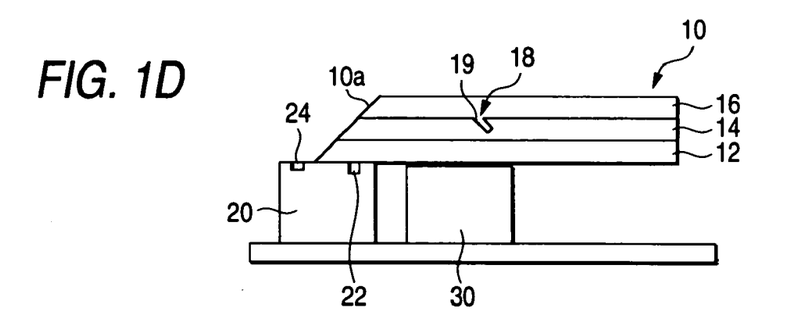

Further, in FIG. 1C and FIG. 1D, an example in which the notched portion is formed only in the waveguide core is shown. In FIG. 1C and FIG. 1D, parts indicated by the equal symbols in FIG. 1A indicate identical parts.

The optical waveguide module shown in FIG. 1C and FIG. 1D is formed using a mold in which the notched portion is formed in the core at the time of manufacturing the optical waveguide film (see the second method for manufacturing the optical waveguide film described later) and hence, an adhesive agent or curable resin for forming the upper clad film is filled in the notched portion during the manufacturing step. Accordingly, compared to the case in which the notched portion is exposed to air (FIG. 1A, FIG. 1B), the refractive index difference with the core becomes small and hence, the refractive index is decreased. However, by setting the refractive index difference between the core and the upper clad film or the adhesive agent to a suitable value, it is possible to obtain the reflecting light for monitoring. For example, assuming a case in which the refractive index of the core is 1.59 and the refractive index of the adhesive agent or the upper clad film is 1.51, there exists 0.3% of the reflection of an s component (a component having the strength of an electric field perpendicular to an incident surface) of the light incident on the 45° surface whereby it is possible to operate the light receiving element for monitoring with the s component.

In such a case, to increase an area of the optical path changing surface of the notched portion by forming a notch in the inside of the core more deeply, it is effective to form the notch using a dicing saw provided with an extremely thin vertical cutting blade which can form the notched portion shown in FIG. 1B. In this case, irrespective of the depth of the notch in the inside of the core, it is possible to form a fixed notch opening portion and hence, the area of the opening portion is not increased even when the deep notch is formed whereby it is possible to easily take the light which passes through the notched portion directly into the waveguide without scattering the light. FIG. 1D shows an example in which such a notched portion is formed.

It is preferable to set the size (depth) of the notched portion such that a quantity of light which has an optical path thereof changed by the optical path changing surface is necessary and enough to monitor using the light receiving element for monitoring.

The quantity of light which has an optical path thereof changed by the optical path changing surface of the notched portion differs not only depending on the size of the optical path changing surface but also depending on whether the notched portion is in contact with air or is filled with the curable resin or the like. Further, a quantity of light to be monitored also is changed depending on the characteristics that the light receiving element for monitoring possesses.

Accordingly, the size of the notched portion is suitably determined by taking these factors into consideration.

Further, with respect to the position where the notched portion is formed, to obtain a proper mode dispersion state, the position is preferably set to a position which is slightly remote from the light emitting point of the light emitting element as viewed in the horizontal direction, that is, a position where the notched portion does not extend over the optical path changing mirror surface of the optical waveguide film. To be more specific, it is desirable that the notched portion is positioned at a position 1 mm or more away from the optical path changing mirror surface as viewed in the horizontal direction. Further, in view of the arrangement of the light receiving element for monitoring, it is desirable that the notched portion is positioned at a position 1 mm or more away from the light emitting point.

The method for forming the notched portion is not limited and the forming position, the size, the shape and the like of the notched portion can be suitably selected.

In case of the above-mentioned notched portion shown in FIG. 1A, for example, it is possible to adopt a method in which the notched portion is formed by cutting the core one time using a dicing saw provided with a blade having a 45-degree distal end. On the other hand, in case of the above-mentioned notched portion shown in FIG. 1B, for example, it is possible to adopt the above-mentioned method in which the notched portion is formed by cutting the core one time using the dicing saw or a method which performs the radiation of excimer laser beams one time. Both methods can be extremely easily performed. Further, with respect to the example shown in FIG. 1C and FIG. 1D, as will be described later, it is possible to adopt a method in which a notched portion is formed in a projecting portion of an original disc in an original disc manufacturing step in manufacturing the optical waveguide film. With respect to the method for forming the notched portion, it is possible to use a method which is substantially equal to the method used for forming the notched portions shown in FIG. 1A and FIG. 1B.

As the dicing saw, for example, it is possible to use a dicing saw DAD321 which is a product of Disco Corporation. With the use of the dicing saw, for example, it is possible to suppress the substantial error of the blade position within approximately 3 μm. Accordingly, with respect to the waveguide core having the size of 50×50 μm diameter, it is possible to perform a control to form the notch having a depth of approximately 10 μm from the upper surface of the core. Further, since the notch can be formed uniformly in plural cores which constitute a waveguide array, there arise no irregularities among the cores. Further, when the notched portion is formed using such a method, even when a clad material flows into the notched portion, a rate of scattering the transmitting light can be decreased thus giving rise to an advantageous effect that the loss is decreased.

Figure 2A:
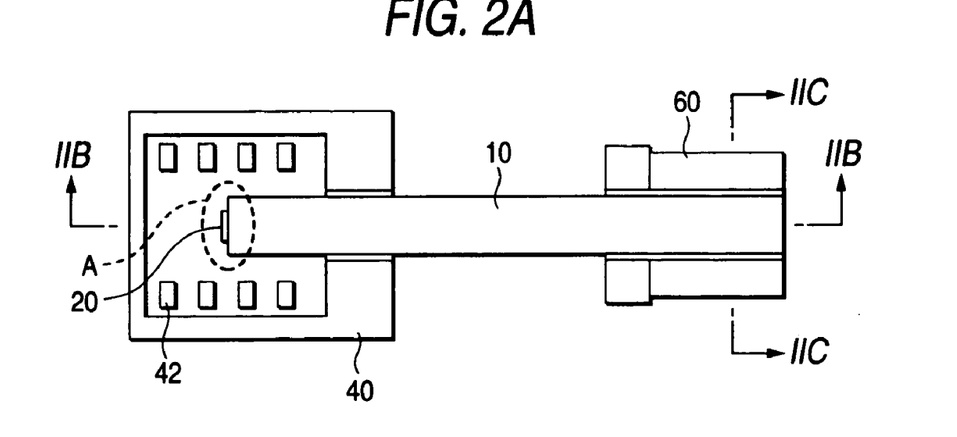
FIG. 2A is a plan view.
Figure 2B:
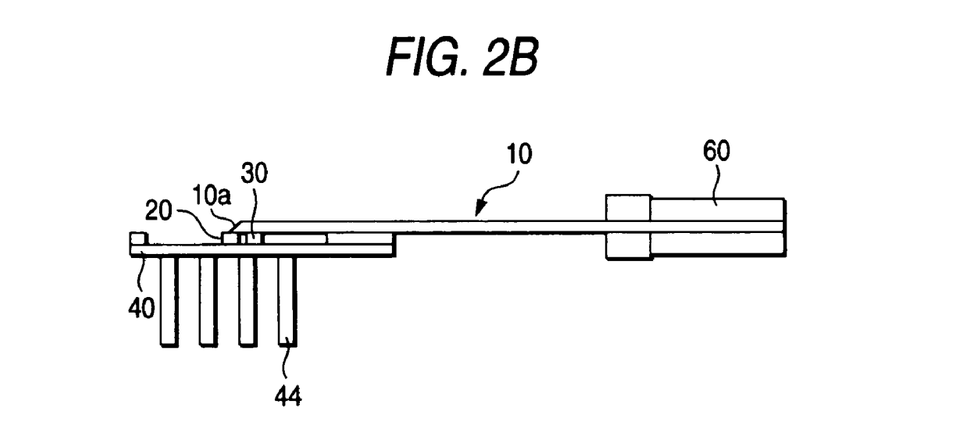
FIG. 2B is a cross-sectional view taken along a line X—X in FIG. 2A.
Figure 2C:
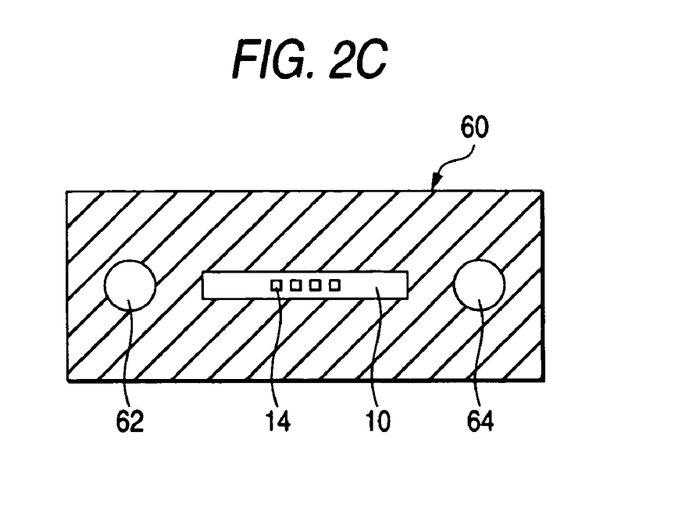
FIG. 2C is a cross-sectional view taken along a line Y—Y in FIG. 2A.

Next, still another example of the optical waveguide module of the present invention is explained in conjunction with FIG. 2A to FIG. 2C. FIG. 2A to FIG. 2C show one example of an optical waveguide module to which a connector for connecting a guided wave exit end portion of the optical waveguide film to another element (for example, an optical fiber), for example, a connector which has interchangeability with a commercially available MT connector is coupled. FIG. 2A is a plan view, FIG. 2B is a cross-sectional view taken along a line IIB—IIB in FIG. 2A, and FIG. 2C is a cross-sectional view taken along a line IIC—IIC in FIG. 2A. In FIG. 2A to FIG. 2C, numeral 10 indicates an optical waveguide film, numeral 10a indicates a 45° mirror surface, numeral 14 indicates a waveguide core, numeral 20 indicates a light emitting element, numeral 30 indicates a light receiving element, numeral 40 indicates a ceramic package, numeral 42 indicates an electrode, and numeral 44 indicates an electrode pin. Numeral 60 indicates a connector, and numerals 62, 64 indicate holes formed in the connector 60 for aligning with a connector (not shown in the drawing) formed in another element (for example, an optical fiber). Although not shown in the drawing, an electrode 24 (see FIG. 3) of the light emitting element 20 is connected with the electrode 42 in the ceramic package.

Figure 3A:
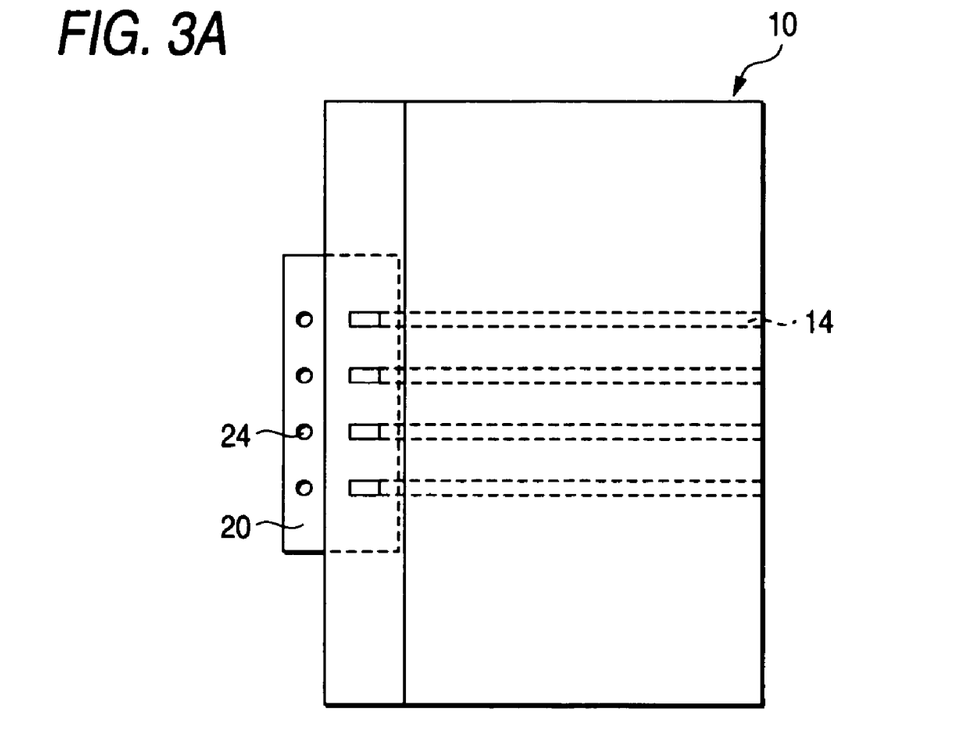
FIG. 3A and 3B are detailed views of a portion A in FIG. 2A.
Figure 3B:
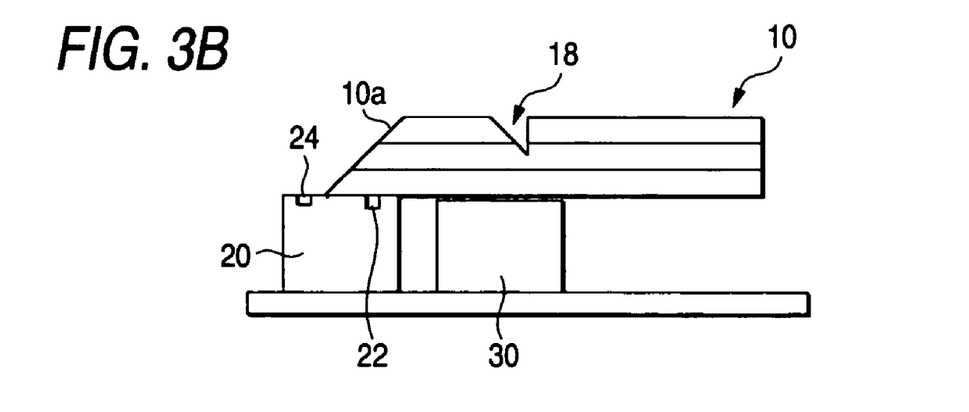

Further, FIG. 3A and FIG. 3B are detailed views which enlarge a portion A in FIG. 2A, wherein FIG. 3A is a plan view and FIG. 3B is a cross-sectional view taken along a line IIB—IIB in FIG. 2A. In FIG. 3A and FIG. 3B, numeral 14 indicates a waveguide core, numeral 18 indicates a notched portion formed in an optical waveguide film, numeral 22 indicates a light emitting point of a light emitting element, and numeral 24 indicates an electrode of the light emitting element.

In this optical waveguide module, the light emitting element, the optical waveguide film and the light receiving element are formed on a ceramic package. The light emitting element and the light receiving element are bonded to the ceramic package using an adhesive agent or the like and, at the same time, the light emitting element and an end portion (45° mirror surface forming end portion) of the optical waveguide film are bonded to each other using an adhesive agent or the like. Here, the optical waveguide film and the light receiving element are aligned in a state that light from the light emitting point of the light receiving element is incident on the optical path changing mirror surface of the optical waveguide film. Further, the light receiving element is arranged at a position where a reflection light from an optical path changing surface of the notched portion formed in the optical waveguide film is incident.

As the light emitting element, from a viewpoint of bonding the light emitting element with the end portion of the optical waveguide film by adhesion, a surface emitting type light emitting element is preferably used. Further, a VCSEL, an LED and the like are named as the surface emitting type light emitting element. Further, as the light receiving element for monitoring, from a viewpoint of boding the light receiving element with the lower clad film of the optical waveguide film by adhesion, a flat type light receiving element is preferably used. As the flat type light receiving element used for monitoring, a Pin photo diode, an avalanche photo diode and the like can be named.

The optical waveguide film used in the optical waveguide module includes, as shown in FIG. 1, the lower clad film, the waveguide core, the upper clad film and the notched portion, wherein the "lower clad film" indicates a clad arranged close to the light receiving element for monitoring of the optical waveguide module.

The optical waveguide film may be formed in accordance with the following steps, for example. Here, to facilitate the explanation, in the explanation of the first method, the clad film on which the core is formed in the following step 3) is used as the "lower clad film" and the clad film which is stacked on a core forming surface in the following step 5) is used as the "upper clad film". However, it is needless to say that the clad film in the step 3) constitutes the "upper clad film" in the optical waveguide film of the present invention and the clad film in the step 5) constitutes the "lower clad film". (In the second method, the clad film used in the step 3) constitutes the "lower clad film").

The method including the following steps is preferably used for manufacturing the optical waveguide film in the example shown in FIG. 1A and FIG. 1B.

1) a step of preparing a mold which is formed of a cured layer of a curable resin for forming a mold and is provided with a recessed portion corresponding to a convex portion of the waveguide core and two or more through holes which are respectively communicated with one end and another end of the recessed portion;

2) a step of bringing a lower clad film having favorable close contact characteristics with the mold into close contact with the mold;

3) a step of filling the through hole formed in one end of the recessed portion of the mold which is brought into close contact with the lower clad film with curable resin for forming a core and filling the recessed portion of the mold with the core-forming curable resin by performing vacuum suction of the core-forming curable resin from the through hole formed in another end of the recessed portion of the mold;

4) a step of curing the core-forming curable resin and peeling off the mold from the lower clad film;

5) a step of forming an upper clad film on the lower clad film on which a core is formed; and 6) a step of forming a notched portion having an optical path changing surface at a portion of the waveguide core from a surface of the upper clad film.

Figure 4A:
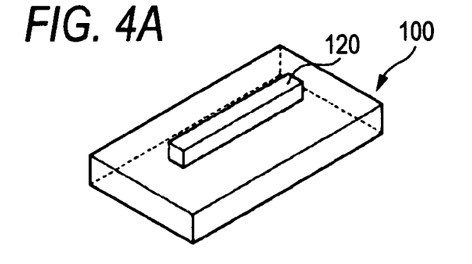
FIG. 4A to 4G are conceptual views showing a manufacturing process of an optical waveguide film.
Figure 4B:
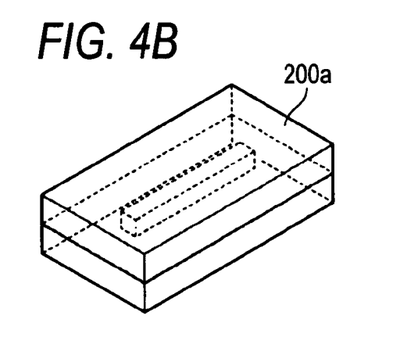
Figure 4C:
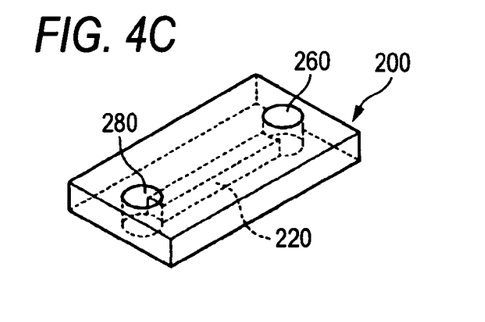

The steps 1) to 5) out of the above-mentioned manufacturing steps of the optical waveguide film are explained hereinafter in conjunction with FIG. 4. For facilitating the explanation, the explanation is made with respect to the case in which one waveguide core is used. FIG. 4A shows an original disc 100, wherein numeral 120 indicates a convex portion corresponding to a waveguide core. Mold-forming curable resin is applied to or formed by molding on a convex portion forming surface of the original disc 100 and, thereafter, is cured (see FIG. 4B). In FIG. 4B, numeral 200a indicates a cured resin layer. Thereafter, when the cured resin layer 200a is peeled off, the cured resin layer 200a in which the recessed portion is formed is obtained (not shown in the drawing). In the cured resin layer 200a in which the recessed portion 220 is formed, through holes 260, 280 which are communicated with the recessed portion 220 are formed by blanking both end portions of the recessed portion or the like whereby a mold 200 is obtained (see FIG. 4C).

Figure 4D:
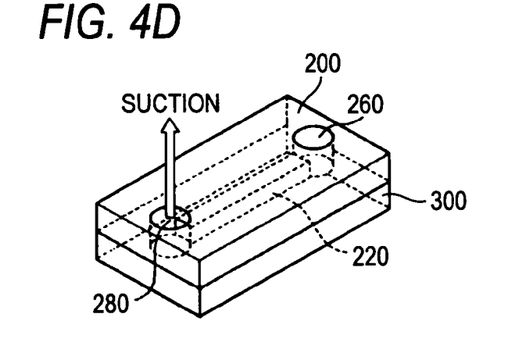
Figure 4E:
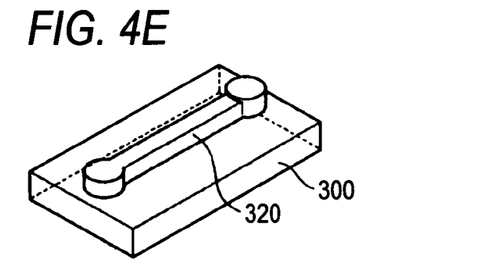
Figure 4F:
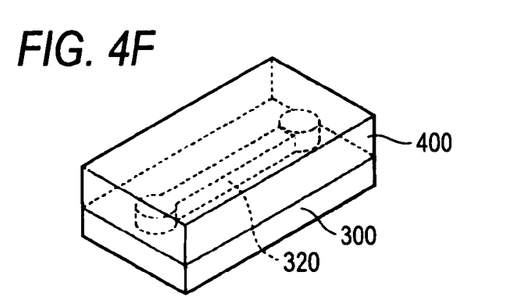

Next, as shown in FIG. 4D, the lower clad film 300 is brought into close contact with the mold. Thereafter, core-forming curable resin is filled into the through hole 260 formed in the mold, and the core-forming curable resin is sucked under a reduced pressure from the through hole 280 formed in another end so as to fill the core-forming curable resin into the recessed portion 220 of the mold. Thereafter, the resin is cured and the mold is removed to form, as shown in FIG. 4E, an optical waveguide core 320 on a lower clad film 300.

Figure 4G:
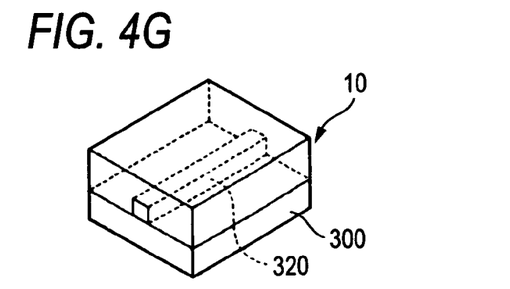

Thereafter, the upper clad film 400 is formed (see FIG. 4F) and, finally, resin portions which are cured in the inside of the through holes 260 and 280 are cut off using a dicer to form the optical waveguide film 10 (see FIG. 4G).

Next, the respective steps are explained.

1) a step of preparing a mold which is formed of a cured layer of a mold-forming curable resin and is provided with a recessed portion corresponding to a convex portion of the waveguide core and two or more through holes which are respectively communicated with one end and another end of the recessed portion.

Although it is preferable to manufacture the mold using the original disc on which a convex shape portion corresponding to an optical waveguide core is formed, the manufacture of the mold is not limited to such a method. Hereinafter, the method which uses the original disc is explained.

In the manufacture of the original disc on which the convex portion corresponding to the optical waveguide core is formed, it is possible to use the conventional method, for example, the photolithography method without any particular limitation. Further, a method which manufactures a polymer optical waveguide by an electro-deposition method or a photo-electro-deposition method (Japanese Patent Laid-Open Publication No. 2002-333538) is also applicable to the manufacture of the original disc. The size of the convex portion corresponding to the optical waveguide formed on the original disc is suitably determined corresponding to the application or the like of the polymer optical waveguide. For example, in case of the optical waveguide for a single mode, a core having about 10 μm square is used, while in case of the optical waveguide for a multiple mode, a core having about 50 to 100 μm square is generally used. According to the application, it is possible to make use of an optical waveguide having a still larger core portion having several hundred μm square.

As an example of the manufacture of the mold, it is possible to name a method in which on the convex portion forming surface of the original disc formed in the above-mentioned manner, a layer made of mold-forming curable resin is formed by a method which applies or forms the mold-forming curable resin by molding and, thereafter, when necessary, the dry treatment is performed and the curing treatment is performed and, thereafter, the cured resin layer is peeled off from the original disc and takes a mold in which the recessed portion corresponding to the convex portion is formed, and the through holes which are respectively communicated with one end and another end of the recessed portion are formed in the mold. The communication holes are formed by blanking the mold in a given shape, for example. Even when the through holes are formed by blanking, the mold and the clad film substrate are favorably brought into contact with each other and hence, no gap is formed between the mold and the lower clad film besides the recessed portion of the mold whereby there is no possibility that the core-forming curable resin penetrates other than the recessed portions.

Although a thickness of the mold (layer of cured resin) is suitably determined by taking the handling property of the mold into consideration, it is generally proper to set the thickness to approximately 0.1 to 50 mm.

Further, it is preferable to perform the mold removing treatment such as applying of a mold peeling agent to the original disc in advance to enhance the peeling off the original disc from the mold.

The through hole on the core-forming curable resin filling side has a reservoir of liquid (core-forming curable resin). Further, the through hole formed on the core-forming curable resin discharging side is used for performing the suction under reduced pressure to reduce the pressure inside the recessed portion of the mold at the time of filling the recessed portion of the mold with the resin. The shape and the size of the filling-side through hole are not limited particularly, provided that the through hole is communicated with the filling end of the recessed portion and has a function of serving as a reservoir of liquid. The shape and the size of the discharge-side thorough hole are not limited particularly, provided that the discharge-side through hole is communicated with the discharge end of the recessed portion and is used for the suction under reduced pressure.

Since the through hole formed on the core-forming curable resin filling side of the recessed portion of the mold has a function of the liquid reservoir, when the mold is brought into close contact with the lower clad film, by allowing a cross-sectional area of the through hole to become large on a side that the through hole is brought into contact with the substrate and to become small as the through hole is spaced apart from the substrate, it is possible to easily peel off the mold from the substrate after filling and curing the core-forming curable resin into the recessed portion. It is unnecessary to provide the liquid reservoir function to the through hole formed on the core-forming curable resin discharging side, hence it is unnecessary for the through hole formed on the core-forming curable resin discharging side to adopt such a constitution.

Further, as another example of manufacturing the mold, it is possible to name a method in which not only the convex portion corresponding to the optical waveguide core but also a convex portion for forming the through hole (a height of the convex portion being set greater than a thickness of the cured layer of the mold-forming curable resin) are formed in the original disc, the mold-forming curable resin is applied to the original disc in a state that the convex portion for forming the through hole penetrates the resin layer and, then, the resin layer is cured and, thereafter, the cured resin layer is peeled off from the original disc.

It is preferable that the mold-forming curable resin used in the manufacture of the mold has properties that the cured material can be easily peeled off from the original disc, the cured material has fixed or more mechanical strength and size stability required as a mold (for the repeated use), the cured material has hardness (the degree of hardness) for maintaining the recessed shape, and the good close contact property with the lower clad film. It is preferable to add various additives to the mold-forming curable resin when necessary.

The mold-forming curable resin is required to be applied to or molded on the surface of the original disc and, at the same time, is required to accurately copy convex portions formed on the original disc corresponding to respective optical waveguide cores and hence, it is preferable that the mold-forming curable resin has the viscosity of a certain limit or less, for example, approximately 500 to 7000 mPa.s. (Here, the "mold-forming curable resin" used in this specification includes resin which becomes a rubber-like body having resiliency after curing). Further, it is possible to add a solvent for viscosity adjustment to the mold-forming curable resin to an extent that the solvent does not adversely influence the mold-forming curable resin.

The mold-forming curable resin preferably uses curable-type organo-poly-siloxane which constitutes silicone rubber (silicone elastomer) or silicone resin after curing from a viewpoint of the above-mentioned peeling property, the mechanical strength, the size stability, the hardness, the close contact property with the clad substrate. It is preferable that the curable-type organo-poly-siloxane includes a methyl-siloxane group, an ethyl-siloxane group, and a phenyl-siloxane group in molecules thereof. The curable organo-poly-siloxane may be either a one-compoent type or a two-component type which is used in combination with a curable agent. Further, the curable organo-poly-siloxane may be a thermosetting type or a room-temperature curing type (cured with moisture in air, for example). Still further, the curable organo-poly-siloxane may make use of other curing method (ultraviolet ray curing or the like).

As the curable organo-poly-siloxane, it is preferable to use curable organo-poly-siloxane which becomes silicone rubber after curing. As the curable organo-poly-siloxane, the silicone rubber which is usually referred to as the liquefied silicone rubber (including the curable organo-poly-siloxane in a paste form having high viscosity) is used. It is preferable to use a two-liquid type which is used in combination with a curing agent. Particularly, with respect to the addition-type silicone rubber in a liquefied form, it is possible to cure both of a surface and the inside thereof uniformly in a short period. Further, since a byproduct is not produced or hardly produced at the time of curing and hence, the addition-type silicone rubber in a liquefied form exhibits the excellent peelability and a small contraction rate.

With respect to the above-mentioned liquefied silicone rubber, it is preferable to use the liquefied di-methyl-siloxane rubber in view of the close contacting property, the peelability, the strength and the hardness. Further, the cured material of the liquefied di-methyl-siloxane rubber generally has the low refractive index of approximately 1.43 and hence, the mold which is formed of the liquefied di-methyl-siloxane rubber is not peeled off from the clad substrate and can be preferably directly used as the upper clad film. In this case, it is necessary to provide the constitution which prevents the mold, the filled core forming resin and the clad substrate from being peeled off from each other.

The viscosity of the liquefied silicone rubber is, from a viewpoint of accurately copying the convex portions corresponding to the optical waveguide cores and of easing the defoaming by reducing the mixing of bubbles and a viewpoint of manufacturing the mold having a thickness of several mm, preferably set to approximately 500 to 7000 mPa.s, and more particularly to approximately 2000 to 5000 mPa.s.

A surface energy of the mold is set to 10 dyn/cm to 30 dyn/cm, and more preferably to 15 dyn/cm to 24 dyn/cm in view of the close contact property with the substrate film.

The Shore hardness of the mold is set to 15 to 80, and more preferably to 20 to 60 from viewpoints of mold forming performance, the maintenance of the shape of the recessed portion and the peelability.

The surface roughness of the mold (square mean value roughness (RMS)) is preferably 0.2 µm or less, and more preferably 0.1 µm or less in view of the mold forming performance.

Further, it is preferable that the mold has the light transmitting property in the ultraviolet ray region and/or in the visible light region. The reason that it is preferable to provide the light transmitting property to the mold in the visible light region is that the alignment can be easily performed at the time of bringing the mold into close contact with the lower clad film in the following step 2) and the manner in which the recessed portion of the mold is filled with the core-forming curable resin can be observed in the following step 3) whereby the completion of the filling operation can be easily confirmed. Further, the reason that it is preferable to provide the light transmitting property to the mold in the ultraviolet ray region is that when ultraviolet ray curable resin is used as the core-forming curable resin, it is possible to perform the ultraviolet ray curing through the mold whereby it is preferable that the transparency of the mold in the ultraviolet ray region (250 nm to 400 nm) is 80% or more.

The curable-type organo-poly-siloxane, particularly, the liquefied silicone rubber which becomes silicone rubber after curing exhibits both of the excellent close contact property with the lower clad film and the excellent peelability which contradict each other and hence, has the ability to copy the nano-structure whereby by bringing the silicone rubber into close contact with the lower clad film, it is possible to prevent the intrusion of liquid. The mold which uses such silicone rubber can accurately copy the original disc and is favorably brought into contact with the lower clad film and hence, it is possible to efficiently fill the core forming resin only in the recessed portion between the mold and the lower clad film and, at the same time, the peeling off of the mold from the lower clad film can be facilitated. Accordingly, it is possible to extremely easily manufacture the polymer optical waveguide which maintains the shape with high accuracy from the mold.

2) the step of bringing a lower clad film having favorable close contact characteristics with the mold into close contact with the mold.

The optical element which is formed of the polymer optical waveguide of the present invention is used in the light wiring in various layers and hence, the material of the lower clad film is selected by taking optical characteristics such as the refractive index, the optical transparency or the like, the mechanical strength, the heat resistance, the close contact property with the mold, the flexibility and the like into consideration depending on the usage of the optical element. Further, to take out the monitor light from the lower clad film, it is necessary to allow the lower clad film to have the optical transparency.

As the above-mentioned film, a cycloaliphatic acrylic resin film, a cycloaliphatic olefin resin film, a cellulose tri-acetate film, a fluororesin film or the like can be named. It is desirable that the refractive index of the film substrate is set to a value smaller than 1.55, and preferably to a value smaller than 1.52 to ensure the refractive index difference with the core. It is preferable that the lower clad film has the resiliency.

As the above-mentioned cycloaliphatic acrylic resin film, OZ-1000 or OZ-1100 (made by Hitachi Chemical Co., Ltd.) which incorporates aliphatic cyclic hydrocarbon of tricyclodecane or the like in an ester substituent is used.

Further, as the cycloaliphatic olefin resin film, the resin film having the norborne structure in a principal chain, and the resin film having the norborne structure in a principal chain and a polar group such as alkyloxycarbonyl group (alkyl group having the carbon number of 1 to 6 or a cycloalkyl group) in side chains are named. Particularly, the cycloaliphatic olefin resin having the norborne structure in a principal chain and a polar group such as alkyloxycarbonyl group in side chains has the excellent optical characteristics such as the low refractive index (the refractive index being around 1.50 thus ensuring the difference in refractive index between the core and the clad) and the high optical transparency and the like, exhibits the excellent close contact property with the mold, and also exhibits the excellent heat resistance and hence, this cycloaliphatic olefin resin film is suitable for the manufacture of the optical waveguide sheet of the present invention.

Further, a thickness of the lower clad film is preferably set to at least 20 μm to ease the handling at the time of stacking and to maintain the mechanical strength imparted to the optical waveguide film. When the film thickness is smaller than 20 μm, at the time of manufacturing, a bending force is applied to the waveguide core portion and hence, a strain is liable to be generated in a core portion whereby a yield rate is deteriorated or the performance is remarkably lowered. Further, from a viewpoint of ensuring the mechanical strength of the optical waveguide film, it is preferable to increase the thickness of the lower clad film.

On the other hand, since the lower clad film is directly bonded to the light receiving element and the light emitting element without passing through the micro lens and hence, the thickness of the lower clad film directly becomes a length of an optical path between the optical path changing mirror surface of the optical waveguide film and the light emitting point and a length of an optical path between a light receiving point of the light receiving element and the optical path changing surface of the notched portion. Accordingly, to ensure the bonding efficiency, it is desirable that the thickness of the lower clad film remains small. To consider that above-mentioned situation, an upper limit of a thickness of the lower clad film is set to 200 μm or less, preferably 100 μm or less, and more preferably 70 μm or less.

3) a step of filling the through hole formed in one end of the recessed portion of the mold which is brought into close contact with the lower clad film with core-forming curable resin and filling the recessed portion of the mold with the core-forming curable resin by performing vacuum suction of the core-forming curable resin from the through hole formed in another end of the recessed portion of the mold.

In this step, the core-forming curable resin is filled into the through hole formed on the resin filling portion side and, thereafter, by performing the suction under pressure from the through hole formed on the resin discharge side so as to fill the core-forming curable resin into a space (the recessed portion of the mold) which is formed between the mold and the lower clad film. Due to the suction under the reduced pressure, the close contact property of the mold and the lower clad film is enhanced whereby the mixing of bubbles can be obviated. The suction under the reduced pressure is, for example, performed by inserting a suction pipe into the through hole formed on the discharge portion side and by connecting the suction pipe to a pump.

As the core-forming curable resin, various kind of resin such as the radiation beam curable resin, the electron beams curable resin, thermosetting resin or the like can be used. Particularly, the ultraviolet ray curable resin and the thermosetting resin are preferably used.

Further, as the ultraviolet ray curable resin or the thermosetting resin for forming core, ultraviolet-ray-curing or thermosetting monomer, oligomer or the mixture of the monomer and oligomer is preferably used.

Further, as the ultraviolet ray curable resin, epoxy-based, polyimide-based or acrylic ultraviolet ray curable resin is preferably used.

Since the core-forming curable resin is filled into a space (recessed portion of the mold) formed between the mold and the lower clad film based on capillarity, the core-forming curable resin to be used is required to possess the sufficiently low viscosity to enable such filling. Accordingly, the viscosity of the curable resin is preferably set to 10 mPa.s to 200 mPa.s, more preferably 20 mPa.s to 1000 mPa.s, and still more preferably 30 mPa.s to 500 mPa.s.

Besides the above-mentioned conditions, to reproduce the original shape of the convex portion formed on the original disc corresponding to the optical waveguide core with high accuracy, it is necessary that a volumetric change of the curable resin before and after curing is small. For example, when the volume is reduced, it gives rise to a waveguide loss. Accordingly, it is preferable that the volumetric change of the curable resin is as small as possible. That is, the volumetric change of the core-forming curable resin is preferably 10% or less, more preferably 6% or less. Since the lowering of the viscosity using a solvent induces the large volumetric change of the core-forming curable resin before and after curing, it is preferable to obviate the use of the solvent for lowering the viscosity.

To decrease the volumetric change (contraction) of the core-forming curable resin after curing, polymer may be added to the resin. The polymer may preferably be polymer which has the compatibility with the core-forming curable resin and does not adversely influence the refractive index, the resiliency and the transmitting characteristics of the resin. Further, the addition of the polymer can not only decrease the volumetric change but also control the viscosity and a glass transfer point of the cured resin with high accuracy. As such a polymer, for example, acrylic-based polymer, metharylic-based polymer or epoxy-based polymer can be used. However, the polymer is not limited to these polymers.

The refractive index of the cured material of the core-forming curable resin is required to be greater than the refractive index of the above-mentioned films which become clad (including the upper clad film in the step 5) described later) and is 1.50 or more, and preferably 1.53 or more. The difference in refractive index between the clad (including the upper clad film in the step 5) described later) and the core is 0.01 or more, and preferably 0.02 or more.

4) the step of curing the core-forming curable resin and peeling off the mold from the lower clad film.

In this step, the filled core-forming curable resin is cured. To cure the ultraviolet ray curable resin, an ultraviolet ray lamp, an ultraviolet ray LED, a UV radiation device or the like is used, while to cure the thermosetting resin, the heating of the thermosetting resin in an oven or the like is used.

Further, the mold used in the above-mentioned steps 1) to 3) can be directly used for forming the upper clad film provided that the conditions such as the refractive index and the like are satisfied. In this case, it is unnecessary to peel off the mold and the mold can be directly utilized as the upper clad film. Further, in this case, it is preferable to apply an ozone treatment to the mold to enhance the adhesive property between the mold and the core material.

5) the step of forming an upper clad film on the lower clad film on which a core is formed.

Although the upper clad film is formed on the lower clad film on which the core is formed, as the upper clad film, a film (for example, the lower clad film used in the above-mentioned step 2) being used in the same manner), a layer which is obtained by applying and curing clad-forming curable resin, a polymer film which is obtained by applying and drying a solution solvent of a polymer material or the like can be named. As the clad-forming curable resin, ultraviolet ray curable resin or thermosetting resin is preferably used. For example, the ultraviolet ray curing or the thermosetting monomer, oligomer or the mixture of the monomer and oligomer is used. Although various kinds of resins including acrylic resin, epoxy-based resin and the like exist as the ultraviolet ray curable resin, resin which belongs to a non-solvent based resin group and has a volume contraction rate of approximately 4 to 5% is commercially available and obtainable. With the use of the ultraviolet ray curable resin, it is possible to ensure the favorable optical transparency. Although the volumetric contraction ratio of the thermosetting resin is smaller than the volumetric contraction ratio of the ultraviolet ray curable resin, the optical transparency of the thermosetting resin is generally slightly lower than the optical transparency of the ultraviolet ray curable resin.

To reduce the volumetric change (contraction) of the clad-forming curable resin after curing, it is possible to add polymer (for example, methacrylic or epoxy-based polymer) which has the compatibility with the resin and does not adversely influence the refractive index, the elastic modulus, the transmitting characteristics of the resin to the resin.

When a film is used as the upper clad film, the film is laminated using an adhesive agent. Here, it is desirable that the refractive index of the adhesive agent is close to the refractive index of the film. As the adhesive agent to be used, the ultraviolet ray curable resin or the thermosetting resin is preferably used, wherein, for example, monomer, oligomer and the mixture of the monomer and the oligomer, of the ultraviolet ray curable resin or the thermosetting resin is used.

To decrease the volumetric change (contraction) after curing of the ultraviolet ray curable resin or the thermosetting resin, polymer similar to the polymer added to the upper clad film is added to the adhesive agent.

It is desirable to set the refractive index of the upper clad film to 1.55 or less, and more preferably to 1.52 or less to ensure the difference in refractive index between the upper clad film and the core. Further, it is also preferable to set the refractive index of the upper clad film and the refractive index of the film substrate equal to each other in view of the confinement of light.

6) the step of forming a notched portion having an optical path changing surface at a portion of the waveguide core from a surface of the upper clad film.

In this step, the notched portion having the optical path changing surface at the portion of the waveguide core is formed in the above-mentioned manner.

The optical waveguide film shown in FIG. 1C and FIG. 1D can be manufactured by the method which includes the following steps.

1) a step of preparing a mold which is formed of a cured layer of a mold-forming curable resin and is provided with a recessed portion corresponding to a convex portion of the waveguide core having a notched portion which includes an optical path changing surface and two or more through holes which are respectively communicated with one end and another end of the recessed portion;

2) a step of bringing a lower clad film having favorable close contact characteristics with the mold into close contact with the mold;

3) a step of filling the through hole formed in one end of the recessed portion of the mold which is brought into close contact with the lower clad film with core-forming curable resin and filling the recessed portion of the mold with the core-forming curable resin by performing vacuum suction of the core-forming curable resin from the through hole formed in another end of the recessed portion of the mold;

4) a step of curing the core-forming curable resin and peeling off the mold from the lower clad film; and 5) a step of stacking an upper clad film on the lower clad film on which a core is formed.

The second method differs from the first method with respect to a point that, as the mold, the second method uses the mold having the recessed portion corresponding to the core convex portion of the waveguide including the notched portion which has the optical path changing surface. In this method, since the portion which corresponds to the notched portion is already formed in the mold, it is possible to provide a simple and convenient method compared to the method in which the notched portion is formed in every manufactured optical waveguide film as the final step.

To manufacture the mold explained above, in the original disc manufacturing step in the first method, the notched portion may be formed in the convex portion of the original disc on which the convex portion which corresponds to the waveguide core is formed and the mold may be formed based on the original disc. As the method for forming the notched portion, the notched portion forming method in the step 6) of the above-mentioned first method can be used in the same manner. Thereafter, the steps 2) to 5) in the first method can be performed in the same manner to manufacture the optical waveguide film in the present invention.

In the above-mentioned manufacturing method of the optical waveguide film (the previously-mentioned first method), although the step of forming the notched portion is necessary, basically, as described above, by merely bringing the lower clad film which exhibits the favorable close contact property with the mold into close contact with the mold (unnecessary to fix both of them using any particular unit), no gap is formed between the mold and the clad substrate other than the recessed portion structure formed in the mold and hence, the core-forming curable resin is allowed to enter only the recessed portion. Accordingly, it is possible to provide the simplified method in which the optical waveguide film can be manufactured at a low cost.

Further, in this method, the through hole is formed in the mold and suction under the reduced pressure is performed at the core-forming curable resin discharge side of the mold recessed portion and hence, the close contact property of the mold and the film substrate is further enhanced and hence, the mixing of bubbles can be avoided. Accordingly, the second method is characterized in that it is possible to obtain the highly accurate optical waveguide film with the least waveguide loss while ensuring the simple method.

Further, although it is necessary to form the notched portion in the final step, the step per se is a step in which the cutting operation using a dicing saw, for example, is performed only one time and hence, the step is not cumbersome whereby the formation of the notched portion does not damage the characteristics of the optical waveguide film manufacturing method which is simplified and convenient and can be performed at a low cost.

The second manufacturing method which forms the notched portion only in the core provides the further convenient method in which it is sufficient to form the notched portion in the original disc manufacturing step.

In the optical waveguide film of the present invention, it is possible to form the optical path changing mirror surface necessary for the planar mounting of the optical waveguide film on the light emitting element such as the VCSEL or the like by the cutting forming using the dicing saw in the same manner as the usual end face. A technique on the dicing saw is, for example, disclosed in Japanese Patent Laid-Open Publication No. Hei 10-300961.

The present invention is further explained specifically in conjunction with the following embodiments. However, the present invention is not limited by them.

First Embodiment

A thick film resist (product of MicroChem Corp., SU-8) is applied to a Si substrate by a spin coating method, is then pre-baked at a temperature of 80° C., is exposed through a photo mask, and is developed thus forming four optical waveguide convex portions having a square cross section (width: 50 µm, height: 50 µm, length: 50 mm, pitch: 250 µm). Next, the optical waveguide convex portions are post-baked at 120° C. to form the optical waveguide core manufacturing original discs.

Next, after applying a mold removing agent to the original disc, thermosetting dimethylcyclic resin (product of Dow Coning Asia Corporation, SYLGARD184) is made to flow into the original discs, is solidified by being heated at a temperature of 120° C. for 30 minutes and is peeled off thus manufacturing molds having recessed portions corresponding to optical waveguides convex portions having the square cross section and the alignment mark convex portions (thickness of mold: 5 mm).

Further, through holes having a diameter of 3mm respectively are formed in both ends of the recessed portion of the mold to expose both ends of the recessed portion thus manufacturing the mold in which inlet and outlet portions for ultraviolet ray curable resin which are described below are formed.

The mold and a film substrate having a design film thickness of 100 µm one size larger than the mold (Arton film, product of JSR Corporation, refractive index: 1.510) are prepared. The Arton film and the mold are brought into close contact with each other. Next, when several drops of ultraviolet ray curable resin having the viscosity of 1300 mPa.s are dropped in the hole formed in each end of the optical waveguide manufacturing recessed portion formed in the mold and the hole is sucked with a suction force of 20 kPa using a diaphragm suction pump (maximum suction pressure: 33.25 kPa), the ultraviolet ray curable resin is filled into each recessed portion. Next, the resin is radiated with UV light of 50 mW/cm$^2$ through the mold for 5 minutes thus curing the mold with ultraviolet rays. When the mold is peeled off from the film substrate, a core having the same shape as the convex portion on the original disc is formed on the film substrate. The refractive index of the core is 1.53. Cladding ultraviolet ray curable resin having the refractive index of 1.51 and the Arton film having the thickness of 100 µm are applied to the core, they are radiated with a UV light of 50 mW/cm$^2$ for 10 minutes for curing the clad-forming ultraviolet ray curable resin thus forming an optical waveguide film having the sandwich structure which sandwiches the core with the upper and lower Arton films. Further, the optical waveguide film is cut to a width 2 mm using a dicing saw in a state that the waveguide core is positioned at the center. Further, a joining portion of the optical waveguide film with the optical fiber is straightly cut in the direction orthogonal to the waveguide core to expose a vertical mirror surface.

At a position spaced apart from the above-mentioned vertical mirror surface by 25 mm, first of all, a 45° mirror surface for inputting a VCSEL light is formed. This forming operation is performed by mounting a blade having a 45° distal end on the dicing saw. Further, at a position between the 45° mirror surface and the vertical mirror surface and 2 mm spaced apart from the distal end of the 45° mirror surface (the distal end portion of optical waveguide film), a notch having the inclination of 45° is formed into the core from an upper surface of the upper clad film in a state that a depth from an upper surface of the core becomes 5 µm.

A ceramic package is prepared and an 1×8 VCSEL (product of Fuji Xerox Co., Ltd.) and a drive driver are mounted on the ceramic package. In the vicinity of the VCSEL, an 1×8 PD (photo detector for monitoring) is mounted on the ceramic package, and an output from the PD is connected with a feedback port of the drive driver.

The optical waveguide film is adhered to the VCSEL and the PD using the clad-forming curable resin. Here, the adhering operation is performed in a state that the position of the 45° mirror surface corresponds to the VCSEL light emitting surface and the position of the notched portion in the midst of the core corresponds to the monitor PD. Further, on an end portion of the optical waveguide film, a connector which is interchangeable with the commercially available MT connector is mounted by adhesion thus completing the optical module.

The insertion loss of the optical module is 2.8 dB using an output of the VCSEL as the reference and the irregularities of the insertion loss among respective ports can be suppressed within 0.2 dB.

Further, the stable output is ensured until an ambient temperature is elevated to 80 degrees.

COMPARATIVE EXAMPLE 1

When the optical module having the same structure except for that the optical module is not provided with the monitor PD is manufactured, an output when the ambient temperature is elevated to 80 degrees becomes one tenth of the output when the temperature is 20 degrees.

Second Embodiment

A thick film resist (product of MicroChem Corp., SU-8) is applied to a Si substrate by a spin coating method, is then pre-baked at a temperature of 80° C., is exposed through a photo mask, is developed thus forming eight optical waveguide convex portions having a square cross section (width: 50 µm, height: 50 µm, length: 50 mm, pitch: 250 µm). Next, the optical waveguide convex portions are post-baked at a temperature of 120° C.

Thereafter, using a dicing saw which mounts a 45° blade, a notch having a depth of 10 µm is formed from an upper surface of each convex portion thus forming an original disc for manufacturing the optical waveguide core (see the core shown in FIG. 1C).

Next, after applying a mold removing agent to the original disc, thermosetting dimethylcyclic resin (product of Dow Coning Asia Corporation, SYLGARD184) is made to flow into the original discs, is solidified by being heated at a temperature of 120° C. for 30 minutes, and is peeled off thus manufacturing molds having recessed portions corresponding to optical waveguides convex portions having the square cross section and the alignment mark convex portions (thickness of mold: 5 mm). Further, through holes having a diameter of 3 mm respectively are formed in both ends of the recessed portion of the mold to expose both ends of the recessed portion thus manufacturing the mold in which inlet and outlet portions for ultraviolet ray curable resin which are described below are formed.

The mold and a film substrate having a design film thickness of 100 µm one size larger than the mold (Arton film, product of JSR Corporation, refractive index: 1.510) are prepared. The Arton film and the mold are brought into close contact with each other. Next, when several drops of ultraviolet ray curable resin having the viscosity of 1300 mPa.s are dropped in the through hole formed in one end of the optical waveguide manufacturing recessed portion and the curable resin is sucked from the through hole formed in another end of the recessed portion of the mold with a suction force of 20 kPa using a diaphragm suction pump (maximum suction pressure: 33.25 kPa), the ultraviolet ray curable resin is filled into each recessed portion. Next, the resin is radiated with a UV light of 50 mW/cm$^2$ through the mold for 5 minutes thus curing the mold with ultraviolet rays. When the mold is peeled off from the film substrate, a core having the same shape as the convex portion on the original disc is formed on the film substrate. The refractive index of the core is 1.59. Cladding ultraviolet ray curable resin having the refractive index of 1.51 and the Arton film having the thickness of 100 µm are applied to the core, they are radiated with a UV light of 50 mW/cm$^2$ for 10 minutes for curing the clad-forming ultraviolet ray curable resin thus forming an optical waveguide film having the sandwich structure which sandwiches the core with the upper and lower Arton films. Further, the optical waveguide film is cut to a width 2.5 mm using a dicing saw in a state that the waveguide core is positioned at the center. Further, a joining portion of the optical waveguide film with the optical fiber is straightly cut in the direction orthogonal to the waveguide core to expose a vertical mirror surface. The position is disposed 23 mm away from the notched surface formed in the core.

At a position spaced apart from the above-mentioned vertical mirror surface by 25 mm, a 45° mirror surface for inputting a VCSEL light is formed. The 45° mirror surface is formed by mounting a blade having a 45 degree distal end on a dicing saw.

A ceramic package is prepared and a 1×8 VCSEL (product of Fuji Xerox Co., Ltd.) and a drive driver are mounted on the ceramic package. In the vicinity of the VCSEL, an 1×8 PD (photo detector for monitoring) is mounted on the ceramic package, and an output from the PD is connected with a feedback port of the drive driver.

The optical waveguide film is adhered to the VCSEL and the PD using the clad-forming curable resin. Here, the adhering operation is performed in a state that the position of the 45° mirror surface corresponds to the VCSEL light emitting surface and the position of the notched portion in the midst of the core corresponds to the monitor PD. Further, on an end portion of the optical waveguide film, a connector which is interchangeable with the commercially available MT connector is mounted by adhesion thus completing the optical module.

The insertion loss of the optical module is 3.2 dB using an output of the VCSEL as the reference and the irregularities of the insertion loss of respective ports can be suppressed within 0.2 dB.

Further, the stable output is ensured until an ambient temperature is elevated to 80 degrees.

Third Embodiment

A thick film resist (product of MicroChem Corp., SU-8) is applied to a Si substrate by a spin coating method, is then pre-baked at a temperature of 80° C., is exposed through a photo mask, is developed thus forming eight optical waveguide convex portions having a square cross section (width: 50 µm, height: 50 µm, length: 50 mm, pitch of neighboring portions: 250 µm). Next, the optical waveguide convex portions are post-baked at a temperature of 120° C.

Thereafter, the original disc is formed by forming notches in the convex portions. As a dicing saw for forming the notches, a dicing saw on which a vertical cutting blade having a thickness of 20 µm is mounted is used. In a state that the Si substrate on which eight convex portions are formed as described above is fixed at an angle of 45° with respect to the blade of the dicing saw using a retaining jig, the notches are formed to a depth of 28 µm from upper surfaces of the convex portions. Here, width of the notches is set to 23 µm.

Next, after applying a mold removing agent to the original disc, thermosetting dimethylcyclic resin (product of Dow Coning Asia Corporation, SYLGARD184) is made to flow into the original discs, is solidified by being heated at a temperature of 120° C. for 30 minutes and is peeled off thus manufacturing molds having recessed portions corresponding to optical waveguides convex portions having the square cross section and the alignment mark convex portions (thickness of mold: 5 mm).

Further, through holes having a diameter of 3mm respectively are formed in both ends of the recessed portion of the mold to expose both ends of the recessed portion thus manufacturing the mold in which inlet and outlet portions for ultraviolet ray curable resin which are described below are formed.

The mold and a film substrate having a design film thickness of 100 µm one size larger than the mold (Arton film, product of JSR Corporation, refractive index: 1.510) are prepared. The Arton film and the mold are brought into close contact with each other. Next, when several drops of ultraviolet ray curable resin having the viscosity of 1300 mPa.s are dropped in the through hole formed in one end of the recessed portion of the mold and the curable resin is sucked from the through hole formed in another end of the mold recessed portion with a suction force of 20 kPa using a diaphragm suction pump (maximum suction pressure: 33.25 kPa), the ultraviolet ray curable resin is filled into each recessed portion. Next, they are radiated with a UV light of 50 mW/cm$^2$ through the mold for 5 minutes thus curing the mold with ultraviolet rays. When the mold is peeled off from the film substrate, a core having the same shape as the convex portion on the original disc is formed on the film substrate. The refractive index of the core is 1.59. The Arton film having the thickness of 100 μm is stacked on the core by way of the clad-forming ultraviolet ray curable resin (adhesive agent) having the refractive index of 1.51, and they are radiated with a UV light of 50 mW/cm² for 10 minutes for curing the clad-forming ultraviolet ray curable resin thus forming an optical waveguide film having the sandwich structure which sandwiches the core with the upper and lower Arton films. Further, the optical waveguide film is cut to a width 2.5 mm using a dicing saw in a state that the waveguide core is positioned at the center. Further, a joining portion of the optical waveguide film with the optical fiber is straightly cut in the direction orthogonal to the waveguide core to expose a vertical mirror surface. The position is disposed 23 mm away from the notched surface formed in the core.

At a position spaced apart from the above-mentioned vertical mirror surface by 25 mm, a 45° mirror surface for inputting a VCSEL light is formed. The 45° mirror surface is formed by mounting a blade having a 45 distal end on a dicing saw.

A ceramic package is prepared and a 1×8 VCSEL (product of Fuji Xerox Co., Ltd.) and a drive driver are mounted on the ceramic package. In the vicinity of the VCSEL, an 1×8 PD is mounted on the ceramic package, and an output from the PD is connected with a feedback port of the drive driver.

The optical waveguide film is adhered to the VCSEL and the PD using the clad-forming curable resin. Here, the adhering operation is performed in a state that the position of the 45° mirror surface corresponds to the VCSEL light emitting surface and the position of the notched portion in the midst of the core corresponds to the monitor PD. Further, on an end portion of the optical waveguide film, a connector which is interchangeable with the commercially available MT connector is mounted by adhesion thus completing the optical module.

The insertion loss of the optical module is 2.8 dB using an output of the VCSEL as the reference and the irregularities of the insertion loss of respective ports can be suppressed within 0.2 dB.

Further, the stable output is ensured until an ambient temperature is elevated to 80 degrees.

As described above, according to an aspect of the present invention, an optical waveguide module includes a light emitting element which outputs light, a light receiving element which monitors an output of the light emitting element and an optical waveguide film having a waveguide core in the optical waveguide film which has a notched portion having an optical path changing surface that changes an optical path of part of the light. The light emitting element is coupled to an end portion of the optical waveguide film, and the light receiving element is provided to face a position of the optical waveguide film from where the part of the light whose optical path has been changed by the optical path changing surface exits.

The light emitting element may be a surface emitting type light emitting element, the optical waveguide film may have an optical path changing mirror surface on one end portion thereof, and light emitted from the surface emitting type light emitting element may be coupled to the waveguide by way of the mirror surface.

The optical path changing mirror surface may be a 45° mirror surface formed by cutting the optical waveguide film with a dicing saw provided with a 45° blade.

The notched portion may be exposed to air. Alternatively, the notched portion may be filled with a cured material of ultraviolet ray curable resin.

The optical path changing surface may be a surface inclined at an angle of approximately 45°.

The surface inclined at an angle of approximately 45° may be formed by cutting the optical waveguide film with a dicing saw provided with a vertical cutting blade which is allowed to have the inclination of approximately 45° with respect to the optical waveguide film.

According to another aspect of the invention, an optical waveguide film includes a lower clad film, a waveguide core having a notched portion having an optical path changing surface at a portion thereof and an upper clad film.

According to another aspect of the invention, a manufacturing method of an optical waveguide film includes the steps of preparing a mold which is formed of a cured layer of a mold-forming curable resin and is provided with a recessed portion corresponding to a protruding portion of the waveguide core and two or more through holes which are communicated with respective ends of the recessed portion, bringing a lower clad film into close contact with the mold, filling one of the through holes formed to communicate with one end of the recessed portion of the mold with core-forming curable resin, the mold being brought into close contact with the lower clad film, and filling the recessed portion of the mold with the core-forming curable resin by performing vacuum suction of the core-forming curable resin from the through hole formed to communicate with another end of the recessed portion of the mold, curing the core-forming curable resin and peeling off the mold from the lower clad film, forming a notched portion at a portion of the waveguide core, the notched portion having an optical path changing surface, and forming an upper clad film on the lower clad film on which a core is formed.

According to another aspect of the invention, a manufacturing method of an optical waveguide film includes preparing a mold which is formed of a cured layer of a mold-forming curable resin and is provided with a recessed portion corresponding to a protruding portion of the waveguide core having a notched portion which includes an optical path changing surface and two or more through holes communicated with respective ends of the recessed portion, bringing a lower clad film into close contact with the mold, filling one of the through holes formed to communicate with one end of the recessed portion of the mold with core-forming curable resin, the mold being brought into close contact with the lower clad film, and filling the recessed portion of the mold with the core-forming curable resin by performing vacuum suction of the core-forming curable resin from the through hole formed to communicate with another end of the recessed portion of the mold, curing the core-forming curable resin and peeling off the mold from the lower clad film, and forming an upper clad film on the lower clad film on which a core is formed.

With the optical waveguide module according to some aspects of the present invention, by merely arranging the optical waveguide film in which the specific notched portion is formed in the waveguide core in a light receiving element for monitoring which monitors the light emitting element and an output of the light emitting element, it is possible to monitor the output of the light emitting element and hence, steps such as the alignment of micro lenses which has been necessary in the related art is no more necessary. Further, in the optical waveguide module of the present invention, it is sufficient to couple the light emitting element to the end portion of the optical waveguide film and hence, it is unnecessary to use the particularly prepared mirrors, lenses and the like. Accordingly, the optical waveguide module of the present invention ensures the easy mounting and, at the same time, has the simple structure thus realizing the manufacture of the optical waveguide module at an extremely low cost. Further, the mounted module is also extremely compact.

Further, the optical waveguide film per se used in the optical waveguide module can be also manufactured using the simple method and hence, the increase of steps for forming the notched portion can be minimized and hence, it is also possible to manufacture the optical waveguide film at a low cost.

Still further, when the waveguide cores of the optical waveguide film are provided in plural number, monitor light can be taken out independently from each waveguide core without affecting other cores and hence, the monitor light from each core accurately reflects the output of the light emitting point whereby the feedback by monitoring can be accurately performed. As a result, it is possible to ensure the uniform outputting from a distal end of each core. Further, although there exists the possibility that the waveguide loss is generated due to the intersection caused by branching the core in the related art. However, some aspects of the present invention has no possibility of generating such a waveguide loss and hence, the outputs of respective cores can be made uniform.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-193847 filed on Jun. 30, 2004 including specification, claims, drawings and abstract is incorporated herein by reference in its entirety.

What is claimed is:

1. A manufacturing method of an optical waveguide film comprising:

preparing a mold which is formed of a cured layer of a mold-forming curable resin and is provided with a recessed portion corresponding to a protruding portion of the waveguide core and two or more through holes which are communicated with respective ends of the recessed portion;

bringing a lower clad film into close contact with the mold;

filling one of the through holes formed to communicate with one end of the recessed portion of the mold with core-forming curable resin, the mold being brought into close contact with the lower clad film, and filling the recessed portion of the mold with the core-forming curable resin by performing vacuum suction of the core-forming curable resin from the through hole formed to communicate with another end of the recessed portion of the mold;

curing the core-forming curable resin and peeling off the mold from the lower clad film;

forming a notched portion at a portion of the waveguide core, the notched portion having an optical path changing surface; and forming an upper clad film on the lower clad film on which a core is formed.

2. A manufacturing method of an optical waveguide film comprising:

preparing a mold which is formed of a cured layer of a mold-forming curable resin and is provided with a recessed portion corresponding to a protruding portion of the waveguide core having a notched portion which includes an optical path changing surface and two or more through holes communicated with respective ends of the recessed portion;

bringing a lower clad film into close contact with the mold;

filling one of the through holes formed to communicate with one end of the recessed portion of the mold with core-forming curable resin, the mold being brought into close contact with the lower clad film, and filling the recessed portion of the mold with the core-forming curable resin by performing vacuum suction of the core-forming curable resin from the through hole formed to communicate with another end of the recessed portion of the mold;

curing the core-forming curable resin and peeling off the mold from the lower clad film; and forming an upper clad film on the lower clad film on which a core is formed.

* * * * *